Sept. 29, 1970  A. E. GANZ ET AL  3,531,137
TRACTORS
Filed Nov. 21, 1967
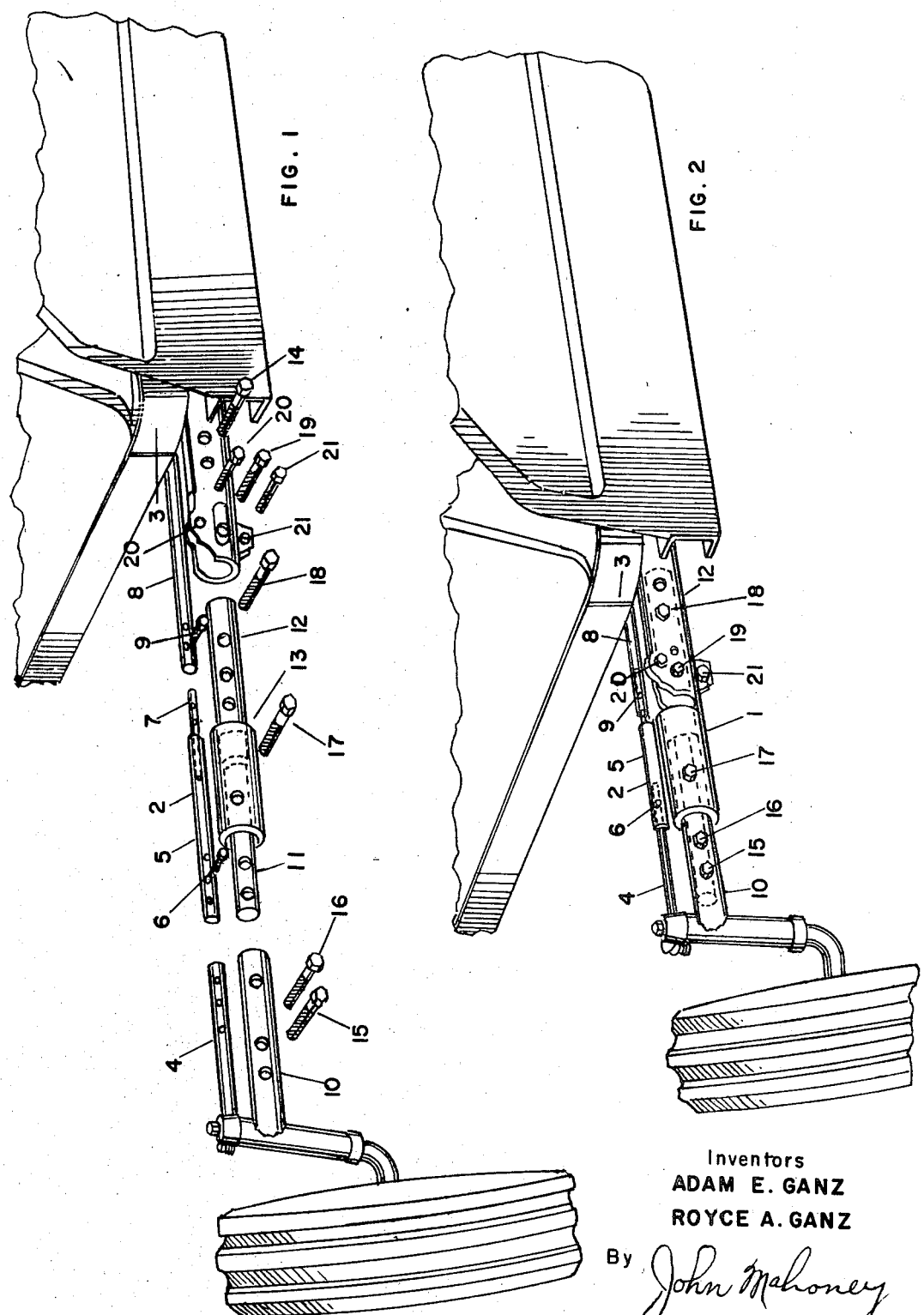
Inventors
ADAM E. GANZ
ROYCE A. GANZ
By John Mahoney
Attorney

United States Patent Office

3,531,137
Patented Sept. 29, 1970

3,531,137
TRACTORS
Adam E. Ganz and Royce A. Ganz, both of Exchange Road, R.D. 2, New London, Ohio 44851
Filed Nov. 21, 1967, Ser. No. 684,688
Int. Cl. B62d 21/14
U.S. Cl. 280—34                                3 Claims

ABSTRACT OF THE DISCLOSURE

Means for extending the front right wheel of a tractor outwardly from alignment with its rear wheel when viewed from the rear of the tractor so that it will ride in the last previously ploughed furrow instead of on the land adjacent the furrow. For this purpose, a tie rod is provided which consists of alternately arranged tubes and rods, each having spaced apertures therein with the rods extending into the tubes and being secured thereto by bolts passing through aligned apertures in the rods and tubes.

The axle also has inner and outer tubular members and a rod interposed therebetween. Both of the tubes and the rods have spaced apertures therein. In addition, the axle is provided with a third tubular member which fits over the outer portion of the rod.

In assembling the device, the effective length of the two rods forming parts of the tie rod may be varied by extending them into the tube 5 to varied distances and the rod 7 in the tube 8 to a predetermined distance. The parts are held in their adjusted position by bolts extending through the aligned apertures in the tubes and rods. In the axle, the outer tube is adjusted inwardly between the rod 11 and the third tubular member and the inner enlarged portion of the rod is adjusted inwardly into the inner tubular member. The parts are fastened together in their adjusted position which may be varied by means of bolts.

---

The present invention relates to tractors and more particularly to a tractor utilized in plowing in which the right hand front wheel as viewed from its rear end extends outwardly to a sufficient distance beyond alignment with its corresponding rear wheel which is beyond the manufacturers' present limitations so that it will ride in the furrow made by the plow in its last previous travel to thereby aid in keeping the rear wheel in sufficiently close relation to the last previously plowed furrow so that the rear wheels and the other front wheel of the tractor may be driven on the land at the proper distance from the ploughed furrow.

In plowing fields with tractors at the present time, it is customary to have each front wheel of the tractor in alignment with one of the respective rear wheels to provide pairs of aligned front and rear wheels. In such case, the operator is required to use considerable diligence to ascertain that the pairs of front and rear aligned wheels being driven on the land adjacent the furrow are at the proper distance from the last previously plowed furrow. Mechanical means, such as chains, are sometimes provided to assist the operator in determining whether the tractor is being driven at the proper distance from the last previously plowed furrow but such means are not entirely satisfactory.

In accordance with the present invention, means associated with the axle and the tie rod are provided for extending the right front wheel of the tractor when viewed from the rear of the tractor outwardly from the body of the tractor at a sufficient distance so that it will ride in the furrow made by the plow in its last previous travel in which case the operator will know at a glance that the land is being properly ploughed.

It is therefore an object of the present invention to provide a tractor having its right front wheel when viewed from the rear of the tractor extending outwardly from alignment with its corresponding rear wheel to such an extent that when the rear wheel is riding on the land adjacent a previously ploughed furrow, the front wheel will rotate within the furrow.

Another object of the invention is to provide a tractor having its right front wheel when viewed from the rear of the tractor extending outwardly from alignment with its rear wheel to an extent which may be varied depending upon the size of the plow so that when the rear wheels and the other front wheel are riding on the land adjacent a previously ploughed furrow, the right front wheel will ride within the furrow, irrespective of the width of the furrow.

A further object of the invention is to provide a tractor having means provided for extending the right front wheel when viewed from the rear end of the tractor outwardly from alignment with its rear wheel beyond the manufacturer's present limitations and bracing the extension in such a manner that the axle and the tie rod associated therewith are firmly supported.

Our invention will be better understood by reference to the accompanying drawings in which:

FIG. 1 is a front elevational view of the front portion of a tractor and a portion of the tie rod and axle extending between the front of the tractor and its right front wheel as viewed from the rear of the tractor, with the parts of the tie rod and axle being shown in a disjointed state; and FIG. 2 is a view similar to that shown in FIG. 1 with the parts joined or splined together and braced to provide a strong support for the tractor.

Although it will be understood that the axle designated generally by the numeral 1 may be of any desired shape, such as square, rectangular, flat, or in the form of an I beam, as illustrated in the drawing, it is substantially round and each of its opposite ends is connected to a tubular member through which a shaft extends, the upper end of which shaft is connected to a tie rod designated generally by the numeral 2 and the lower end of the shaft being connected through an elbow with a spindle upon which the wheel rotates. The steering gear on adjustable wide front end tractors is located at the end of the steering shaft and the front wheels are actuated by means of a drag link which is connected to the tie rod. See, for instance, the structure shown on pages 103 and 115 of Tractors and Crawlers by Frazee and Bedell published by the American Technical Society, Chicago, U.S.A. in 1957, Library of Congress Catalog Card Number 57–5437. As shown in the drawings, the front end 3 of the tractor is supported by the axle.

For extending the right front wheel when viewed from the rear of the tractor which wheel normally rides adjacent the furrow and is in alignment with the corresponding rear wheel to a position in which it extends outwardly beyond the corresponding rear wheel and rotates in the previously ploughed furrow, splicing and bracing means is provided for both the tie rod and the axle and while the splicing and bracing means may be of any desired type that has the necessary strength, as shown in the drawings, the outer portion of the tie rod is in the form of a rod 4 having three spaced apertures therein. A tubular member 5 is also provided which is of a size to snugly receive the inner portion 4 of the tie rod and which has three spaced apertures therein so that when the portion 4 of the tie rod is moved inwardly toward the tractor and the desired aperture in the portion 4 is in alignment with the apertures in portion 5, a bolt 6 may be inserted through the aligned apertures. As shown in FIG. 2, the bolt 6 is passed through the centrally aligned apertures in tube 5 and the central aperture in the rod 4. It will of course be understood that if the bolt 6 is inserted through the outer aperture in tube 5 and the inner aperture in rod 4, the length of the tie rod may be increased or its length may be reduced by inserting the bolt 6 through the inner aperture in tube 5 and the inner aperture in rod 4.

Spaced inwardly from the first splicing means is a second splicing means including a rod 7 having a pair of spaced apertures therein and having one end portion extending into the tube 5 and its opposite end arranged to extend into a tubular portion 8. As shown, the parts are moved inwardly to a sufficient extent so that when a bolt 9 is passed through the outer apertures in tube 8, it will pass through the outer aperture in rod 7. To lengthen the rod, bolt 9 may be passed through the outer aperture in tube 8 and the inner aperture in rod 7. In such case, however, the bracing means will be less effective than in the position shown in the drawings. It will of course be understood that when an aperture is provided in one of the tubes, an aligned aperture is provided in the opposite side of the tube so that the bolts may be passed through both the tube and rod and nuts applied to their threaded free end portions.

The axle may be extended in a somewhat similar manner. As shown, the axle has an outer tubular portion 10 having three apertures therein which are in alignment with similar apertures on the opposite sides of the tube, the inner apertures being spaced at a greater distance from the central apertures than the second apertures are spaced from the first apertures. The axle also includes a rod 11 having three apertures therein, the inner aperture being spaced at a greater distance from the second aperture than the second aperture is spaced from the first aperture. The rod 11 terminates in an enlarged portion 12 having three apertures therein. The axle also includes tubes 13 and 14, tube 13 surrounding rod 11 and its enlarged portion 12 and being spaced outwardly from rod 11 at a sufficient distance to permit tube 10 to be passed between rod 11 and tube 13.

In assembling the axle, the tubular portion 10, together with the front right wheel, is moved inwardly to project the tubular member 10 between the rod 11 and the tubular member 13 and the rod 12 inwardly within the tubular member 14. The inward movement of the tube 10 is sufficient to move the outer apertures in tube 10 in alignment with the outer apertures in rod 11 and its third apertures in alignment with the aligned apertures in tube 13 and the inner aperture in rod 11. When tube 10 is in this position, bolts 15 and 16 are passed through the first and second aligned apertures in the outer end of tube 10 and the corresponding pair of apertures in the rod 11 and bolt 17 is passed through the aperture in tube 13, the inner aligned apertures in tube 10, and the third aperture in rod 11. When the enlarged portion of rod 12 is moved into tube 14, bolt 18 is passed through the second aligned apertures in tube 14 and the second aperture in the rod 12 and a third bolt 19 is passed through the fourth apertures in tube 14 and the outer aperture in the enlarged portion 12 of rod 11. Apertured flanges may also be provided on the tube 14 through which bolts 20 and 21 are extended. When an aperture is designated as being in a tube, it will of course be understood that an aligned aperture is also provided in the opposite side of the tube. It will also be understood that each of the bolts is threaded and is held in place by a nut threaded on to its free end portion.

In the event the tie rod is adjusted to vary its length, the length of the axle must also be varied in a corresponding manner. This may be done by increasing or lessening the distance the rod 12 is inserted in the tube 14. For strengthening purposes, ears must be provided on tube 14 through which bolts 20 and 21 extend.

What is claimed is:

1. In a tractor for use in ploughing having front and rear wheels and downwardly extending tubular members through each of which a shaft extends for actuating the front wheels, an axle extending between said front wheels having its outer ends secured to said tubular members and a tie rod having its outer ends secured to said shafts, and those portions of the axle and tie rod extending between the right hand side of the body of the tractor and the front right wheel when viewed from the rear of the tractor including adjustable portions for spacing the front right wheel of the tractor outwardly to such a distance that the front right wheel of the tractor will ride in a previously ploughed furrow when the rear wheel on the right hand side of the tractor rides on the land adjacent the furrow, said adjustable portion of said axle consisting of outer and inner tubular axle parts, each having a series of aligned apertures therein, and said axle also including a rod interconnecting the inner and outer tubular axle parts, the outer portion of which rod extends to a predetermined distance into the inner portion of the outer tubular axle part and said axle rod having a series of spaced apertures in its outer portion, at least one of which is in alignment with aligned apertures in the outer tubular axle part when the outer tubular axle part is moved inwardly to a position in which the outer end of the axle rod is received within the outer tubular axle part and the inner portion of said axle rod having a series of spaced apertures therein, any one of which may be moved into alignment with any one of the series of aligned apertures in the inner axle tubular part, means extending through one of the series of aligned apertures in the outer tubular axle part and one of the apertures in the outer portion of said axle rod and means extending through one of the series of aligned apertures in the inner tubular axle part and an aperture in the inner portion of said rod to hold the axle parts in their assembled position and to provide an axle having length which may be varied depending upon the aligned apertures in the tubular parts and the axle rod through which the fastening means are inserted, and a reinforcing tube extending around a portion of said rod and said outer tubular axle part and being securable to said rod and said outer tubular axle part.

2. A tractor as defined in claim 1 in which that portion of the axle between the right side of the body portion of the tractor and the front right wheel when viewed from the rear of the tractor consists of outer and inner tubular parts, each having a series of aligned apertures therein, an axle rod having apertures in its outer and inner end portions, said outer tubular axle part being movable inwardly to a position in which it receives the outer end portion of said axle rod and the inner end portion of said axle rod part being movable inwardly to a position in which one of the apertures in its inner end portion is in alignment with aligned apertures in the inner tubular axle part, and a fourth tubular axial part surrounding said axle rod part and the outer tubular axle part and having aligned apertures therein which are in alignment with an aperture in said axle rod part and aligned apertures in the outer tubular axle part, fastening means extending through aligned apertures in said outer tubular axle part and an aperture in the outer portion of said axle rod part, fastening means extending through the fourth tubular axle part, aligned apertures in the outer tubular axle part and through an aperture in the outer portion of said axle rod part, and fastening means extending through one of the series of aligned apertures in the inner tubular axle part and through an aperture in the inner portion of said axle rod part to hold the parts of the axle in their assembled position.

3. A tractor as defined in claim 1 in which that portion of the front axle arranged between the right hand side of the body of the tractor and the right front wheel when viewed from the rear of the tractor consists of spaced outer and inner tubular axle parts, each having a series of aligned apertures therein, said axle portion also including an axle rod, the inner portion of which has a diameter larger than its outer portion and the outer portion of which rod extends to a predetermined distance into the outer aubular axle part, a fourth tubular axle part surrounding said axle rod and having such diameter that the inner end of the outer tubular axle part may be moved inwardly between the outer portion of said axle rod part and the outer portion of said fourth tubular axle part, and said fourth tubular axle part having aligned apertures therein which are in alignment with aligned apertures in the outer tubular axle part when the outer tubular axle part is moved inwardly to a predetermined extent, and the inner portion of said axle rod part having a plurality of spaced apertures therein and being moveable within the inner tubular axle part to a sufficient distance to align any one of its apertures with aligned apertures in the inner tubular axle part, fastening means passing through the pair of aligned apertures in the fourth tubular axle part, aligned apertures in the outer tubular axle part, and an aperture in the outer portion of said axle rod part, and said axle rod part having a series of spaced apertures in its outer end portion, any one of which may be in alignment with a pair of aligned apertures in the outer tubular axle part when the outer tubular axle part is moved inwardly around the outer portion of the axle rod part, fastening means extending through aligned apertures in the outer tubular axle part and an aperture in the outer portion of said axle rod part, and fastening means passing through aligned apertures in the inner tubular axle part and one of the apertures in the inner portion of the rod part to hold said axle parts in their assembled position.

References Cited

UNITED STATES PATENTS

| | | | |
|---|---|---|---|
| 2,938,735 | 5/1960 | Bennett | 280—34.1 |
| 3,154,164 | 10/1964 | Shaw et al. | 280—34 |
| 3,163,438 | 12/1964 | Bliss | 280—34 |

LEO FRIAGLIA, Primary Examiner

R. R. SONG, Assistant Examiner